Jan. 5, 1943.  C. CHEW  2,307,390
HANDLE FOR BOTTLES
Filed Jan. 6, 1941
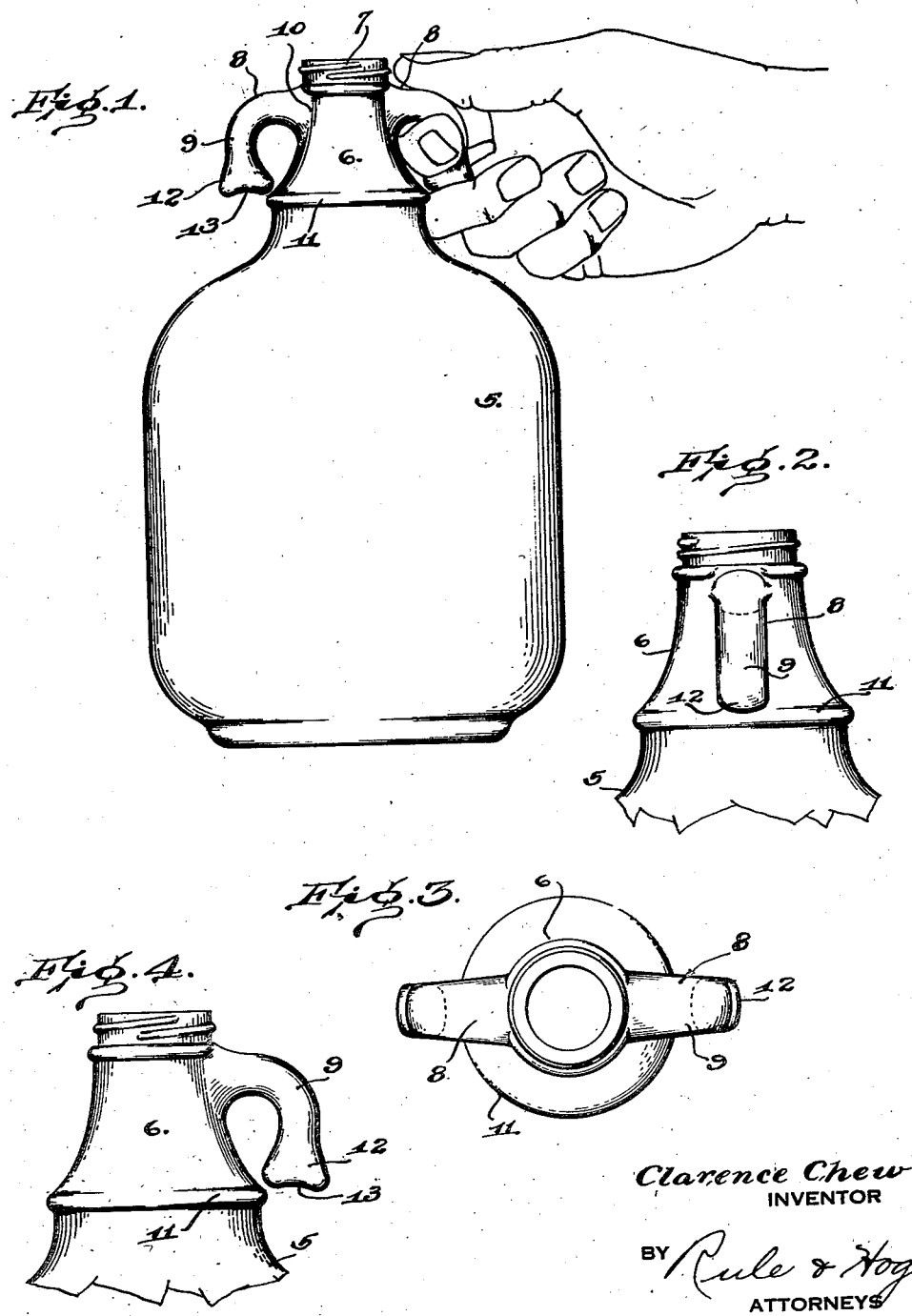
Clarence Chew
INVENTOR
BY Rule & Hoge
ATTORNEYS Patented Jan. 5, 1943

2,307,390

UNITED STATES PATENT OFFICE 2,307,390

HANDLE FOR BOTTLES

Clarence Chew, Alton, Ill., assignor to Owens-Illinois Glass Company, a corporation of Ohio Application January 6, 1941, Serial No. 373,229

5 Claims. (Cl. 215—1)

The present invention relates to improvements in handles for bottles, jugs, and like glass containers.

An object of my invention is the provision of a handle which assumes the form of an incomplete or open loop by reason of which the internal strain and stress present in the conventional complete loop is materially if not entirely eliminated.

Another object is the provision of a loop type of handle so shaped as to facilitate comfortable gripping of the handle and thereby greatly reduce fatigue incident to manipulation and transportation of the containers equipped with such handles. The contour of the loop handle is such as to facilitate firm gripping thereof and ready control of containers during pouring of the contents.

Other objects will be in part apparent and in part pointed out hereinafter.

In the drawing:

Fig. 1 is a side elevational view of a jug provided with loop handles embodying my invention.

Fig. 2 is a fragmentary side elevational view taken at right angles to the view shown in Fig. 1.

Fig. 3 is a top plan view.

Fig. 4 is a fragmentary side elevational view of a slightly modified form of the invention.

While my invention is illustrated in conjunction with a conventional glass jug 5, it may be employed to advantage in connection with bottles, decanters, etc., of various types and shapes.

The jug 5 includes a reduced neck 6 which rises vertically therefrom and is progressively reduced in diameter towards the threaded upper end 7 thereof. In that form of the invention shown in Figs. 1, 2, and 3, a pair of diametrically opposed handles 8 are provided, each handle assuming the form of an open loop 9 which is disposed vertically and has its upper end 10 permanently attached to an upper portion of the neck 6. This loop is curved outwardly and downwardly from its point of connection with the neck and terminates in close proximity to but slightly spaced from the base 11 of the neck. In order to provide a suitable surface designed for contact with a finger of the human hand, the lower free end of the loop is provided with an enlargement 12 and the extreme lower face thereof is formed with a downwardly facing recess or channel 13. The axes of the channel 13 and the loop are substantially parallel to each other, in consequence of which a person desiring to manipulate a container embodying my invention, may insert the first finger through the loop and bring the second finger into firm engagement with both the channel or recess at the free end of the loop and the adjacent surface of the neck. Such positioning of the fingers with the thumb engaging the upper side of the loop provides such firm gripping of the handle that the container may be manipulated with ease and perfect control.

In Fig. 4 I have illustrated a slight modification consisting simply in the omission of one of the loops. Such a structure may well be employed on bottles, decanters, and the like, of relatively small capacity.

Modifications may be resorted to within the spirit and scope of the appended claims.

I claim:

1. In combination, a container having a reduced neck at its upper end defining a filling and discharging opening, a handle comprising a loop disposed vertically and having its upper end permanently connected to the neck and its lower end generally flattened and facing downwardly in close proximity to but spaced from the base portion of the neck.

2. In combination, a container having a reduced neck at its upper end defining a filling and discharging opening, a handle comprising a loop disposed vertically and having its upper end permanently connected to the neck and its lower end generally flattened and facing downwardly in close proximity to but spaced from the base portion of the neck, the lower end of said loop being recessed to accommodate a finger.

3. In combination, a container having a reduced neck at its upper end defining a filling and discharging opening, a handle comprising a loop disposed vertically and having its upper end permanently connected to the neck and its lower end generally flattened and facing downwardly in close proximity to but spaced from the base portion of the neck, the lower end of said loop being enlarged and formed with a concave lower surface to accommodate a finger.

4. In combination, a container, a reduced neck rising therefrom and progressively decreasing in diameter upwardly, a handle provided at one side of the neck and including a loop attached at one end to the upper part of the neck, said loop formed about a normally horizontal axis and having its other end free and terminating in an enlargement disposed in close proximity to but spaced from the base of said neck, said enlargement having a downwardly facing channel in its lower side, the axes of said channel and loop being substantially parallel and at a right angle to the axis of the container.

5. In combination, a container having a reduced neck at its upper end defining a filling and discharging opening, a handle comprising a loop formed integral with the neck, said loop being disposed vertically and having its lower end generally flattened and facing downwardly, said lower end being spaced from and so relatively positioned with respect to the base of the neck that when the loop is grasped by a human hand the second finger may engage both the flattened lower end and adjacent surface of said neck.

CLARENCE CHEW.